Figure 3:
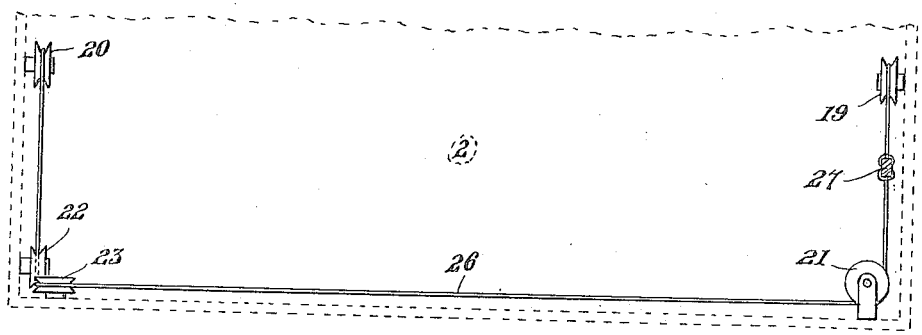

Dec. 26, 1922.
J. BANASZAK.
LOCOMOTIVE HEADLIGHT.
FILED MAR. 8, 1922.
1,440,268
2 SHEETS-SHEET 1
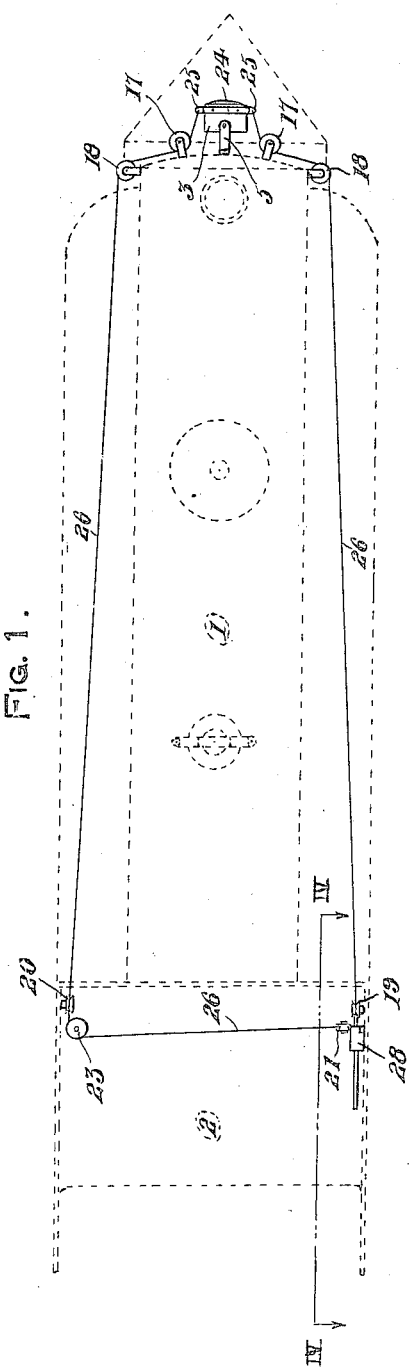
Inventor
J. Banaszak
By J. K. Bryant,
Attorney Dec. 26, 1922.
J. BANASZAK.
LOCOMOTIVE HEADLIGHT.
FILED MAR. 8, 1922.

1,440,268

2 SHEETS-SHEET 2

Inventor
J. Banaszak

By F. K. Bryant
Attorney

Patented Dec. 26, 1922.

1,440,268

UNITED STATES PATENT OFFICE.

JOHN BANASZAK, OF IRONWOOD, MICHIGAN.

LOCOMOTIVE HEADLIGHT.

Application filed March 3, 1922. Serial No. 542,090.

*To all whom it may concern:*

Be it known that I, JOHN BANASZAK, a citizen of Poland, residing at Ironwood, in the county of Gogebic and State of Michigan, have invented certain new and useful Improvements in Locomotive Headlights, of which the following is a specification.

This invention relates to certain new and useful improvements in locomotive headlights, and has particular reference to a headlight of the dirigible type adapted for mounting upon the forward end of a locomotive steam engine with manually operable devices arranged adjacent the engine cab for shifting the headlights to cause the rays projected therefrom to travel in the direction directly forwardly of the locomotive.

The primary object of the invention has reference to a dirigible headlight for locomotives that is manually operable from a point adjacent the locomotive cab with a novel form of spring mounting for the headlight designed for absorbing shocks and jars incident to the travel of the locomotive and also to render the movement of the headlight readily responsive.

With the above general objects in view the invention consists of the novel combination and arrangement of parts hereinafter more fully described in connection with accompanying drawing, and in which like reference characters designate corresponding parts through the several views.

Figure 4:
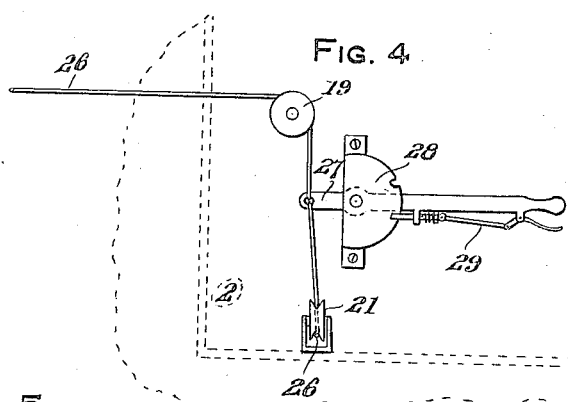
Figure 5:
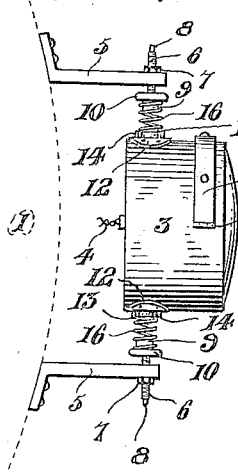
Figure 6:
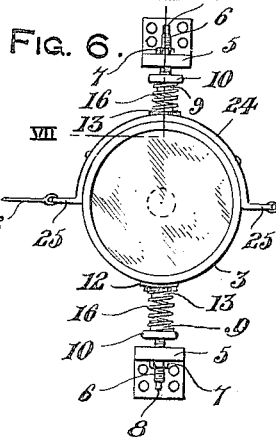
Figure 7:
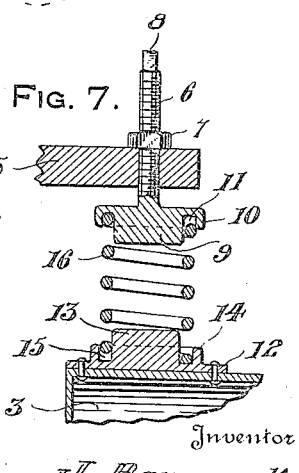

In the drawings:

Fig. 1 is a top plan view of a steam locomotive, illustrated by dotted lines, with the present form of dirigible headlight operatively mounted thereon and illustrated by full lines, Fig. 2 shows by dotted lines, a side elevational view of a locomotive with the invention operatively arranged thereon, showing the headlight at the forward end of the locomotive and the manually operating device for shifting the same arranged adjacent the locomotive cab, Fig. 3 is a detailed sectional view taken on line III—III of Fig. 2 showing the guide pulleys and operating cord with the shifting handle for the lamps fixed to the operating cord, Fig. 4 is a detailed sectional view taken on line IV—IV of Fig. 1 showing the controlling lever for shifting the headlight, Fig. 5 is a side elevational view of the headlight showing the bracket mountings and the adjacent end of the locomotive, Fig. 6 is a front elevational view of the headlight showing the spring mountings and the operating cord attached to each side thereof, and Fig. 7 is a detail sectional view taken on line VII—VII of Fig. 6 showing one of the adjustable spring mountings for the headlight.

Referring more in detail to the accompanying drawings, and particularly to Figures 1 and 2, there is illustrated by dotted lines a locomotive embodying a boiler portion 1 and a cab 2, the headlight disclosed in this application being supported at the forward end of the locomotive boiler as shown in Figures 1 and 2, while the operating lever for shifting the headlight is arranged adjacent the locomotive cab as illustrated.

The headlight, and mounting therefor, is shown more clearly in Figures 1 and 2 and 5 to 7, the headlight embodying a lamp casing 3 of ordinary construction including an electric bulb illuminated by current passing through the wires 4 shown in Fig. 5. The mounting for the lamp embodies a pair of vertically alined brackets 5 mounted upon the forward end of the body of the locomotive with adjusting screws and spring devices interposed between the bracket arms 5 and the lamp casing 3. The adjusting screw embodies a headed stem 6 threaded through the bracket arm 5 as shown in Fig. 7 with a lock nut 7 for holding the screw stem in its adjusted position, the outer end of the stem being provided with a wrench end 8 to facilitate rotation thereof. The inner end of the screw stem is provided with an enlarged head having a central block portion 9 and a peripheral flange 10 defining a channel 11. A spring anchoring block is secured to the adjacent side of the lamp casing 3, the same including a base plate 12 carrying a central plug 13 and a peripheral flange 14 defining a channel 15. A coil spring 16 has its opposite ends received in channels 11 and 15 as shown in Fig. 7, it being noted that the screws 6 are diametrically disposed with respect to the lamp casing 3 while the channels 11 and 15 for the opposite ends of the springs 16 provide a secure lock for retaining the headlight in its proper position. Also, the adjustability of the screws 6 provide for a variance in the tension on the springs 16, the screws being adjusted to compensate for wear and loss of resiliency in the springs.

The mechanism for shifting the headlight casing 3 includes a series of pulleys and operating cords traveling thereover, Figures 1 and 2 of the drawings showing bracket supporting pulleys 17 and 18 arranged adjacent the forward end of the locomotive body with pulleys 19 and 20 alined with the pulleys 18 and arranged adjacent the locomotive cab 2. A pulley 21 is disposed beneath the pulley 19, and angularly disposed pulleys 22 and 23 are arranged beneath the pulley 20 at the opposite side of the cab 2. As shown more clearly in Fig. 6, a strap bracket 24 is secured to the upper wall of the lamp casing 3 and carries laterally directed terminal arms 25 to which the adjacent ends of the operating cords 26 are secured, the cords passing over the pulleys 17—18, the cord 26 at one side of the locomotive body passing over the pulley 19, while the cord 26 at the opposite side of the locomotive body passes over the pulleys 20, 22, 23, and 21, the adjacent ends of the cords 26 are shown in Figures 3 and 4 being secured to the end of the lever 27. The lever 27 is pivotally supported adjacent the locomotive cab 2 and cooperates with a rack segment 28, the lever 27 carrying a tensioned pawl 29 for cooperation with the segment rack to hold the lever in its adjusted set position.

From the above detailed description of the device it is believed that the construction and operation thereof will at once be apparent, it being noted that when the lever 27 is disposed in a horizontal position shown in Figure 4, the headlight 3 is positioned for directing the rays therefrom in a direction directly forwardly of the locomotive body. When it is desired to shift the headlight to either the right or left, to cause the light rays to be projected directly forwardly of the locomotive, the lever 27 is moved either upwardly or downwardly, carrying therewith the operating cords 26, and said cords passing over the several pulleys above described, and being attached to the bracket arms 25 as shown in Figures 1 and 6, the headlight is shifted laterally in the desired direction and may be retained in such position until manually shifted in the direction desired. Also, the spring mounting for the headlight will materially eliminate damage thereto and shocks and jars incident to the travel of the locomotive will be absorbed by the springs 16. The screws 6 may be adjusted to compensate for wear of the springs 16 and also to provide a more rigid mounting for the headlight lamp casing 3.

While there is herein shown and described the preferred embodiment of my invention, it is to be understood that minor changes in construction, combination and arrangement of parts may be made without departing from the spirit and scope of the invention as claimed.

Having thus described the invention, what I claim is:—

In a dirigible headlight for locomotives, a lamp casing, bracket arms carried by the locomotive, screw pins threaded in the bracket arms, a head carried by each pin having a central plug, a peripheral flange with an intermediate channel, a block carried by the lamp casing having a central plug, a peripheral flange and an intervening channel, and a coil spring enclosing the plugs with the opposite ends seated in said channels.

In testimony whereof I affix my signature.

JOHN BANASZAK.